US009531860B2

(12) United States Patent
Yum et al.

(10) Patent No.: US 9,531,860 B2
(45) Date of Patent: Dec. 27, 2016

(54) METHOD OF OPERATING MOBILE TERMINAL FOR CONTROLLING WASHING MACHINE

(75) Inventors: Kwan Ho Yum, Seoul (KR); Sang Oh Kim, Seoul (KR); Bong Mun Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 161 days.

(21) Appl. No.: 13/319,725

(22) PCT Filed: Sep. 11, 2009

(86) PCT No.: PCT/KR2009/005197
§ 371 (c)(1),
(2), (4) Date: Jan. 23, 2012

(87) PCT Pub. No.: WO2010/131817
PCT Pub. Date: Nov. 18, 2010

(65) Prior Publication Data
US 2012/0110747 A1 May 10, 2012

(30) Foreign Application Priority Data

May 11, 2009 (KR) ........................ 10-2009-0041008

(51) Int. Cl.
*G06F 3/048* (2013.01)
*D06L 1/20* (2006.01)
(Continued)

(52) U.S. Cl.
CPC ...... *H04M 1/72533* (2013.01); *A47L 15/0063* (2013.01); *D06F 33/02* (2013.01); *D06F 39/005* (2013.01); *H04M 2250/22* (2013.01)

(58) Field of Classification Search
USPC .................................................. 700/83, 275
See application file for complete search history.

(56) References Cited

U.S. PATENT DOCUMENTS 7,177,712 B2 * 2/2007 Blair et al. ...................... 700/83
8,514,196 B2    8/2013 Kim
(Continued)

FOREIGN PATENT DOCUMENTS

CN    2179399 Y    10/1994
CN    1343806 A    4/2002
(Continued)

OTHER PUBLICATIONS

PCT International Search Report dated May 6, 2010 for Application No. PCT/KR2009/005197, 2 pages.
(Continued)

*Primary Examiner* — Ryan Jarrett
(74) *Attorney, Agent, or Firm* — Fish & Richardson P.C.

(57) ABSTRACT

The present invention relates to a mobile terminal capable of displaying recommended washing machine operation information to control a washing machine, a method of operating the mobile terminal, a washing machine capable of operating the recommended washing machine operation information, and a method of operating the washing machine.
The method of operating the mobile terminal to control a washing machine includes displaying a menu screen including a washing machine management menu, and displaying recommended washing machine operation information which is set according to external environment information when a recommended operation item is selected from the washing machine management menu. Thus since the recommended washing machine operation information is displayed using the mobile terminal according to external conditions such as weather, time, and season irrespective of time and place, convenience is provided.

9 Claims, 11 Drawing Sheets

(51) Int. Cl.
*D06F 33/00* (2006.01)
*H04M 1/725* (2006.01)
*A47L 15/00* (2006.01)
*D06F 33/02* (2006.01)
*D06F 39/00* (2006.01)

(56) References Cited

U.S. PATENT DOCUMENTS

| | | | |
|---|---|---|---|
| 2001/0025392 A1* | 10/2001 | Youn et al. | 8/159 |
| 2002/0040505 A1 | 4/2002 | Tanaka | |
| 2004/0051625 A1* | 3/2004 | Nass et al. | 340/5.31 |
| 2004/0214566 A1* | 10/2004 | Suzuki | G05B 15/02 455/423 |
| 2005/0050647 A1 | 3/2005 | Tanaka | |
| 2005/0109070 A1 | 5/2005 | Kobayashi et al. | |
| 2006/0290465 A1 | 12/2006 | Go et al. | |
| 2007/0116427 A1 | 5/2007 | Youn | |
| 2008/0036452 A1* | 2/2008 | Hirayama | 324/207.2 |
| 2008/0105001 A1* | 5/2008 | Jeong et al. | 68/12.02 |
| 2008/0108388 A1* | 5/2008 | Ebrom et al. | 455/557 |
| 2009/0138107 A1* | 5/2009 | Ha | 700/90 |
| 2010/0236296 A1* | 9/2010 | Choi et al. | 68/13 R |
| 2012/0242684 A1 | 9/2012 | Kim | |

FOREIGN PATENT DOCUMENTS

| | | |
|---|---|---|
| CN | 101110615 A | 1/2008 |
| CN | 101168901 A | 4/2008 |
| CN | 101183292 A | 5/2008 |
| CN | 101307561 A | 11/2008 |
| DE | 29622066 U1 | 4/1998 |
| DE | 102004021019 A1 | 11/2005 |
| EP | 1045355 A1 | 10/2000 |
| KR | 2001113347 A | 12/2001 |
| KR | 20020020832 A | 3/2002 |
| KR | 10-2005-0098792 A | 10/2005 |
| KR | 2005116265 A | 12/2005 |
| KR | 2008079913 A | 9/2008 |
| WO | WO2007004804 A1 | 1/2007 |

OTHER PUBLICATIONS

Office Action dated Jul. 19, 2013 from Chinese Patent Application No. 200980159328.5, including English translation, 38 pages.
Supplementary European Search Report dated Aug. 27, 2014 from corresponding European Application No. 09844691.7, 8 pages.
Korean Office Action dated Jan. 20, 2015 from Korean Patent Application No. 10-2009-0041008, 13 pages.
Notice of Allowance dated Jul. 23, 2015 from corresponding Korean Patent Application No. 10-2009-0041008, 2 pages.
Office Action issued in European Application No. 09844691.7 on Mar. 16, 2016, 8 pages.

* cited by examiner

METHOD OF OPERATING MOBILE TERMINAL FOR CONTROLLING WASHING MACHINE

TECHNICAL FIELD

The present invention relates to a mobile terminal capable of displaying recommended washing machine operation information to control a washing machine, a method of operating the mobile terminal, a washing machine capable of operating the recommended washing machine operation information, and a method of operating the washing machine.

BACKGROUND ART

Recently, home network technologies have been developed. The term "home network" refers to a network in which various home appliances are interconnected to each other so that users can enjoy convenient, safe, and economical life services at any moment inside or outside their houses. With the development of a digital signal processing technology, refrigerators or washing machines, so-called white goods, have gradually been digitalized and a home appliance operating system technique and a high-speed multimedia communication technique have been integrated into digital appliances. With the emergence of information appliances of a new type, the home network has been increasingly developed.

A data network refers to a network established for data exchange between a personal computer and peripheral devices or for Internet services. An entertainment network refers to a network between home appliances dealing with audio or video information. A living network refers to a network established for simple control of appliances, such as home automation and remote meter reading.

A home network system constructed within a household includes a master device, which is an electric device, capable of controlling the operation of home appliances or monitoring the state of the home appliances, and one or more home appliances having a function responding to the demand of the master device and a function informing the master device of a variation in state thereof. The home appliances include both appliances for a living network service, such as a washing machine, a refrigerator, etc., and appliances for a data network service and an entertainment network service.

In order to establish the above-described home network system, however, there is inconvenience in that the master device which can control the operation of home appliances or monitor the state of the home appliances should be additionally provided.

DISCLOSURE

Technical Problem

Therefore, the present invention has been made in view of the above problems, and it is an object of the present invention to provide a mobile terminal capable of displaying recommended washing machine operation information to control a washing machine according to external conditions, such as weather, time, and season, irrespective of time and place, a method of operating the mobile terminal, a washing machine capable of operating the recommended washing machine operation information, and a method of operating the washing machine.

Technical Solution

In accordance with an aspect of the present invention, the above and other objects can be accomplished by the provision of a method for operating a mobile terminal to control a washing machine, including displaying a menu screen including a washing machine management menu, and displaying recommended washing machine operation information which is set according to external environment information when a recommended operation item is selected from the washing machine management menu.

The external environment information may include at least one of weather information, time information, and season information.

The display of the recommended washing machine operation information may include displaying any one of weak washing operation, enhanced washing operation, and enhanced drying operation according to weather information, as the recommended washing machine operation information.

The display of the recommended washing machine operation information may include displaying low noise operation or general operation according to time information, as the recommended washing machine operation information.

The display of the recommended washing machine operation information may include displaying any one of spring standard course operation, wool course operation, fall standard course operation, and synthetic fiber course operation according to season information, as the recommended washing machine operation information.

In accordance with another aspect of the present invention, there is provided a method of operating a mobile terminal for controlling a washing machine, including displaying a menu screen including a washing machine management menu, and displaying a washing machine remote control screen when a remote control item is selected from the washing machine management menu.

In accordance with a further aspect of the present invention, there is provided a mobile terminal for controlling a washing machine, including a controller configured to generate recommended washing machine operation information according to collected external environment information, and a display configured to display a menu screen including a washing machine management menu, and to display the recommended washing machine operation information when a recommended operation item is selected from the washing machine management menu.

In accordance with another aspect of the present invention, there is provided a mobile terminal for controlling a washing machine, including a user input unit, a display configured to display a menu screen including a washing machine management menu, and to display a washing machine remote control screen when a remote control item is selected from the washing machine management menu by the user input unit, and a controller configured to control the display and to remotely control the washing machine.

In accordance with another aspect of the present invention, there is provided a method of operating a washing machine, including receiving recommended washing machine operation information which is set according to external environment information; displaying the recommended washing machine operation; and operating the washing machine according to the recommended washing machine operation.

In accordance with another aspect of the present invention, there is provided a method of operating a washing machine, including transmitting at least one of operation state information and an operation input menu information; receiving operation control signal; and operating the washing machine according to the operation control signal.

In accordance with another aspect of the present invention, there is provided a washing machine, including a wireless communication unit configured to receive recommended washing machine operation information which is set according to external environment information; a display configured to display the recommended washing machine operation information; and a controller configured to operate the washing machine according to the recommended washing machine operation.

In accordance with another aspect of the present invention, there is provided a mobile terminal for controlling a washing machine, including a wireless communication unit configured to transmit at least one of operation state information and an operation input menu information and receive operation control signal; and a controller configured to operate the washing machine according to operation control signal.

Advantageous Effects

According to the present invention, convenience is provided by displaying recommended washing machine operation information according to external conditions, such as weather, time, and season, on a mobile terminal irrespective of time and place.

DESCRIPTION OF DRAWINGS

The above and other objects, features and other advantages of the present invention will be more clearly understood from the following detailed description taken in conjunction with the accompanying drawings, in which.

BEST MODE

Figure 1:
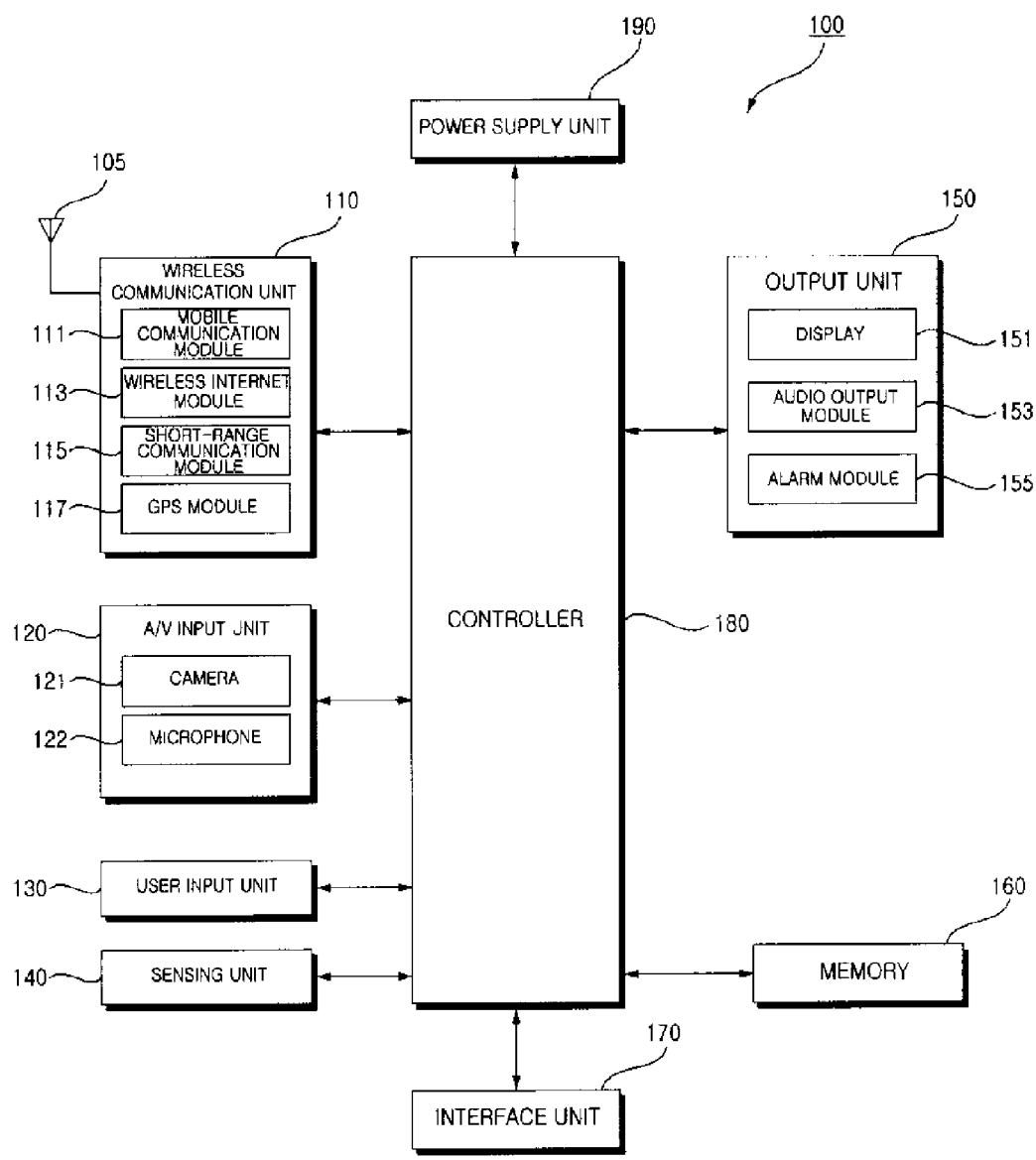
FIG. 1 is a block diagram of a mobile terminal according to an exemplary embodiment of the present invention.

FIG. 1 is a block diagram of a mobile terminal according to an exemplary embodiment of the present invention.

Referring to FIG. 1, a mobile terminal 100 according to the present invention includes a wireless communication unit 110, an audio/video (A/V) input unit 120, a user input unit 130, a sensing unit 140, an output unit 150, a memory 160, an interface unit 170, a controller 180, and a power supply unit 190.

The wireless communication unit 110 includes a mobile communication module 111, a wireless Internet module 113, a short-range communication module 115, and a global positioning system (GPS) module 117.

The mobile communication module 111 transmits and receives wireless signals to and from at least one of a base station, an external terminal, and a server in a mobile communication network. The wireless signals may include a voice call signal, a video phone call signal, or various forms of data used to transmit and receive a text/multimedia message.

The wireless Internet module 113 refers to a module for wireless Internet access. The wireless Internet module 113 may be installed at the interior or exterior of the mobile terminal 100.

The wireless Internet module 113 may receive external environment information (i.e., external conditions) such as weather information, time information, season information, and the like.

The wireless Internet module 113 may transmit washing machine diagnosis data by accessing a service center, when a service call item is selected.

The short-range communication module 115 refers to a module for short-range communication. The near filed communication technology may be Bluetooth, radio frequency identification (RFID), infrared data association (IrDA), ultra wideband (UWB), or Zigbee.

The short-range communication module 115 may receive washing machine state information using, for example, Bluetooth.

The GPS module 117 receives location information from a plurality GPS satellites.

The A/V input unit 120 serves to receive an audio signal or a video signal and includes a camera 121 and a microphone 122. The camera 121 processes a video frame, such as a still image or a moving image, obtained by an image sensor in a video phone call mode or a photographing mode. The processed video frame may be displayed on a display 151.

The video frame processed in the camera 121 may be stored in a memory 160 or may be externally transmitted through the wireless communication unit 110. There may be two or more cameras 121 according to the configuration or aspects of the mobile terminal 100.

The microphone 122 receives an external audio signal through a microphone in a call mode, a recording mode, a voice recognition mode, etc. and processes the audio signal as electric voice data. The processed voice data may be converted into a transmittable form and output to a mobile communication base station through the mobile communication module 111, in the call mode. The microphone mode 122 may use various noise elimination algorithms to remove noise generated in the process of receiving the external audio signal.

The user input unit 130 generates key input data which is input by a user to control the operation of the mobile terminal 100. The user input unit 130 may include a key pad, a dome switch, a touch pad (static pressure/capacitive type), a jog wheel, a jog switch, a finger mouse, etc. Especially, if the touch pad forms an interconnection layer structure with the display 151 which will be described later, the touch pad may be referred to as a touch screen.

The sensing unit 140 senses a current state of the mobile terminal 100, for example, senses the position of the mobile terminal 100, whether the mobile terminal 100 is closed or open, or whether a user touches the mobile terminal 100, and generates a sensing signal for controlling the operation of the mobile terminal 100. If the mobile terminal 100 is a slide phone type for example, the sensing unit 140 may sense whether the slide phone is closed or open. The sensing unit 140 may serve to perform sensing functions related to whether power is supplied to the power supply unit 190 and whether an external device is combined with the interface unit 170.

The output unit 150 generates an audio signal, a video signal, or an alarm signal and may include the display 151, an audio output module 153, an alarm output module 155, etc.

The display 151 displays information processed by the mobile terminal 100. For example, if the mobile terminal 100 is in a call mode, the display 151 displays a user interface (UI) or graphical user interface (GUI) related to a call. If the mobile terminal 100 is in a video phone call mode or a photographing mode, the display 151 may display photographed or received images, respectively or simultaneously and displays a UI or GUI.

The display 151 also displays a menu screen including a washing machine management menu. The washing machine management menu may include at least one of a recommended operation item, a monitoring item, a software upgrade item, and a remote control item.

If the recommended operation item is selected from the washing machine management menu, the display 151 displays a recommended washing machine operation screen including recommended washing machine operation information.

Meanwhile, if the monitoring item is selected, the display 151 may display at least one of operation diagnosis information, error content information, and a service call menu.

If the service call menu item is selected, the display 151 may display a service center connection state screen.

Meanwhile, if the software upgrade item is selected, the display 151 may display a software upgrade processing screen.

If the remote control item is selected, the display 151 may display a menu screen corresponding to a user input unit of a washing machine for washing machine operation. The display 151 may also display a screen of a display of the washing machine together with the menu screen.

The audio output module 153 outputs audio data which is received from the wireless communication unit 110 in a call signal reception mode, a call mode, a recording mode, a voice recognition mode, a broadcast reception mode, etc. or which is stored in the memory 160. The audio output module 153 outputs an audio signal related to functions, performed by the mobile terminal 100, for example, call signal reception sound or message reception sound. The audio output module 153 may include a speaker, a buzzer, etc.

The alarm output module 155 outputs a signal for informing a user of occurrence of an event generated in the mobile terminal 100. The event generated in the mobile terminal 100 may include call signal reception, message reception, and key signal input. The alarm output module 155 may output a signal for informing a user of occurrence of an event in other forms except for an audio signal or a video signal. For example, the alarm output module 155 may output a signal in a vibration form. Upon receiving a call signal or a message, the alarm output module 153 may output vibration to inform the user of the call signal or message. If a key signal is input, the alarm output module 155 may output vibration as feedback for input of the key signal. The user can recognize the occurrence of an event through the output of vibration. A signal for informing a user of the occurrence of an event may also be output through the display 151 or the audio output module 153.

The memory 160 may store a program for processing and controlling the controller 180 or may temporarily store input and output data.

The memory 160 may include at least one type of storage medium among a flash memory, a hard disk, a multimedia card, a memory card (e.g., a secure digital (SD) or extreme digital (XD) memory), a random access memory (RAM), and a read only memory (ROM). The mobile terminal 100 may operate a web storage performing a storage function of the memory 160 over the Internet.

The interface unit 170 performs an interface function with all external devices connected to the mobile terminal 100. The external devices connected to the mobile terminal 100 include a wired/wireless headset, an external charger, a wired/wireless data port, a memory card, a card socket such as a subscriber identity module/user identity module (SIM/UIM) card, an audio input/output (I/O) port, a video I/O port, and an earphone. The interface unit 170 may receive data from such external devices or transmit a received power source to each constituent element of the mobile terminal 100. The interface unit 170 may control data within the mobile terminal 100 to be transmitted to the external devices.

The controller 180 typically controls the operation of the above units and controls the overall operation of the mobile terminal 100. For example, the controller 180 performs control and processing related to a voice call, data communication, and a video phone call.

The controller 180 generates recommended washing machine operation information according to external conditions, when a recommended operation item is selected from the washing machine management menu. The external conditions may include at least one of weather information, time information, and season information.

Meanwhile, the washing machine management menu may include at least one of a recommended operation item, a monitoring item, a software upgrade item, and a remote control item.

The controller 180 may generate any one of weak washing operation, enhanced washing operation, and enhanced drying operation as the recommended washing machine operation information, with reference to the weather information.

The controller 180 may generate low noise operation or general operation as the recommended washing machine information with reference to the time information.

The controller 180 may generate any one of spring standard course operation, wool course operation, fall standard course operation, and synthetic fiber course operation as the recommended washing machine operation information, with reference to the season information.

In this case, the controller 180 may preset a washing time, the number of rinses, dry spinning strength, and a drying time.

Meanwhile, if the remote control item is selected, the controller 180 may control a menu screen corresponding to a user input unit of a washing machine for washing machine operation to be displayed. In addition, the controller 180 may control a screen of a display of the washing machine to be displayed together with the menu screen. The controller 180 may control a washing machine control signal generated by the manipulation of a user to be transmitted to the washing machine.

If the monitoring item is selected, the controller 180 may control at least one of operation diagnosis information, error content information, and a service call item to be displayed. If the service call item is selected, the controller 180 accesses a service center server to transmit washing machine diagnosis data and controls the service center connecting state screen to be displayed.

If the software upgrade item is selected, the controller 180 controls the software upgrade processing screen to be displayed. The controller 180 transmits upgraded software to a washing machine so that the washing machine may upload the software. The transmission of the upgraded software to the washing machine may be performed using the above-described short-range communication module 115, for example, Bluetooth.

The power supply unit 190 receives an external power source or an internal power source under the control of the controller 180 and supplies a power source necessary for the operation of constituent elements of the mobile terminal 100.

The mobile terminal 100 related to the present invention has been described in terms of constituent elements according to functions thereof. Hereinafter, the mobile terminal 100 will be described in terms of constituent elements according to outer appearances thereof with reference to FIG. 2. For simplicity of description, a bar-type mobile terminal having a front touch screen will be described by way of example among various types of mobile terminals such as a folder type, a bar type, a swing type, and a slider type. However, the present invention is not limited to the bar type mobile terminal and may be applied to all types of mobile terminals including the above-described types.

Figure 2:
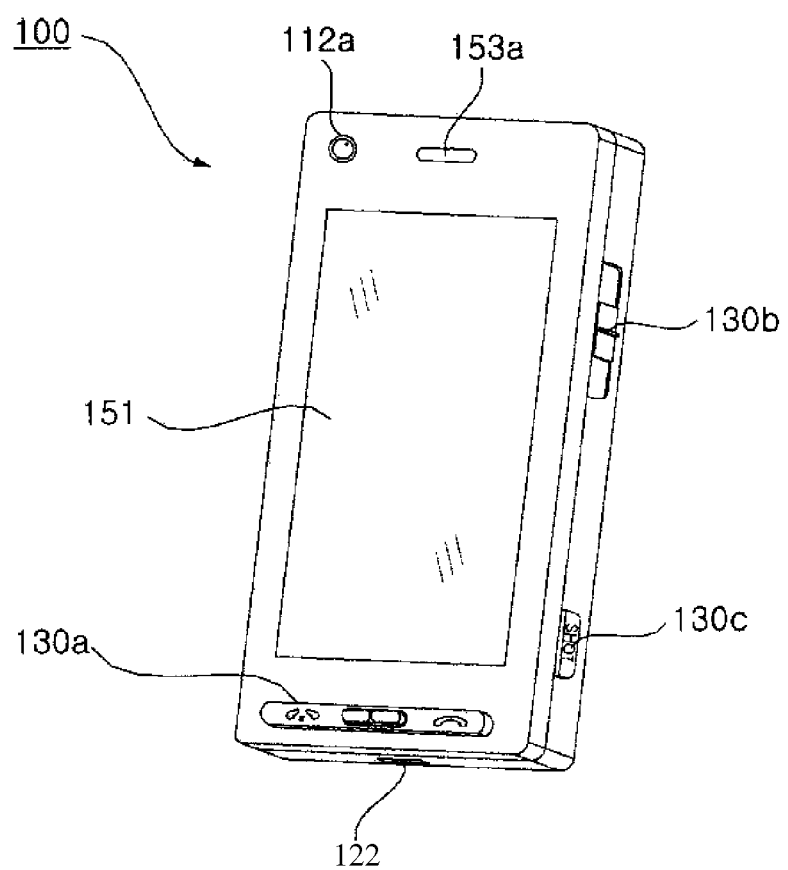
FIG. 2 is a perspective view of a mobile terminal seen from a front side according to an exemplary embodiment of the present invention.

FIG. 2 is a perspective view of a mobile terminal seen from a front side according to an exemplary embodiment of the present invention. Referring to FIG. 2, an outer case is formed of a front case and a rear case. Electronic components are mounted in a space formed by the front case and the rear case. At least one middle case may be additionally arranged between the front case and the rear case.

A display 151, a first audio output module 153*a*, a first camera 112*a*, and a first user input unit 130*a* may be arranged on a body, more specifically, a first front case. A second user input unit 130*b*, a third user input unit 130*c*, and a microphone 122 may be arranged on the lateral side of the rear case.

The display 151 includes a liquid crystal display (LCD), an organic light emitting diode (OLED), etc. to visually display information. A touch pad is overlapped with the display 151 by a layer structure. The display 151 may operate as a touch screen so that information may be input by touch by a user.

The first audio module 153*a* may be constructed in a receiver or speaker form. The first camera 112*a* may be constructed appropriately to photograph user images or moving images. The microphone 122 may be constructed appropriately to receive user voice or other sound.

The first to third user input units 130*a*, 130*b*, and 130*c* may be referred to as a user input unit 130 and may use any type if they are operated in a tactile manner.

For example, the user input unit 130 may be constructed by dome switches or touch pads which can receive commands or information by push or touch manipulation of a user or may be constructed by a wheel or jog rotating keys or a joystick. In a functionality aspect, the first user input unit 130*a* serves to input commands such as start, end, and call, the second user input unit 130*b* serves to input selection of an operational mode etc., and the third user input unit 130*c* may function as a hot key for activating special functions within the mobile terminal 100.

The mobile terminal described in this specification includes a cellular phone, a smart phone, a notebook computer, a terminal for digital broadcasting, a personal digital assistant (PDA), a portable multimedia player (PMP), etc.

Figure 3:
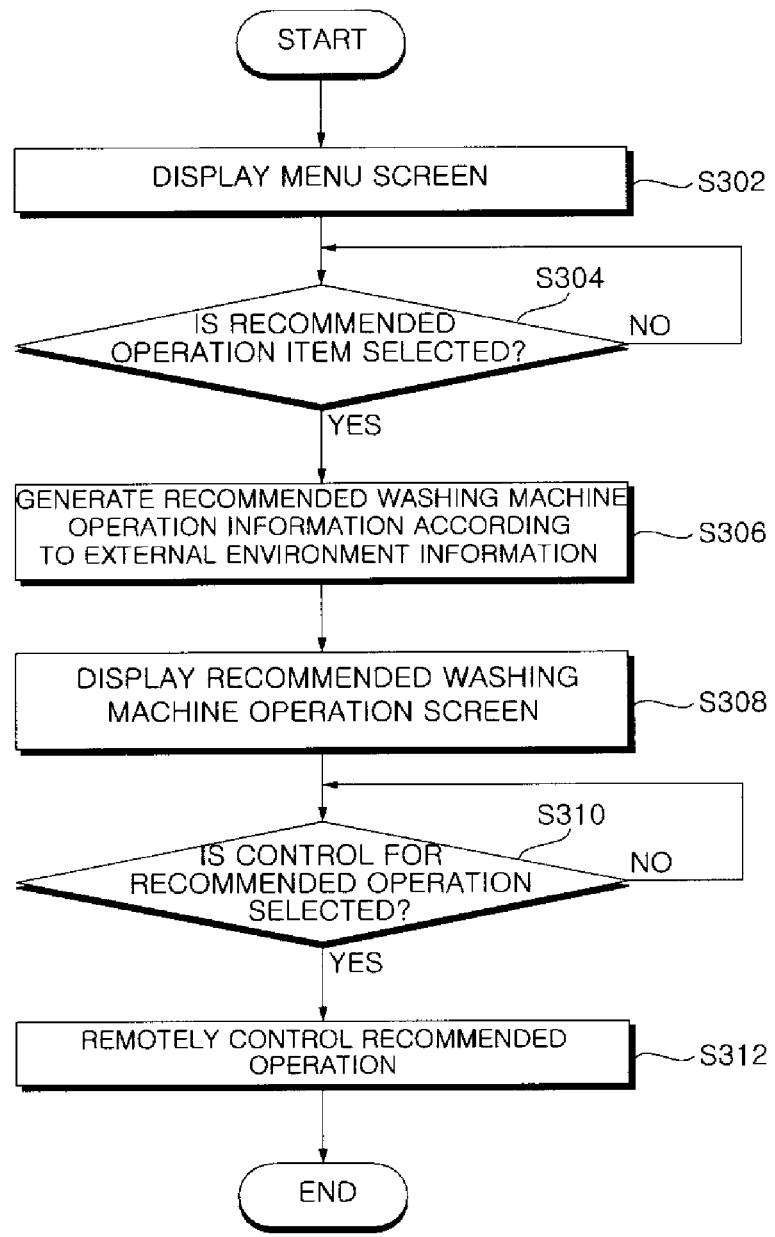
FIG. 3 is a flow chart illustrating a method of operating a mobile terminal for controlling a washing machine according to an exemplary embodiment of the present invention.
Figure 4:
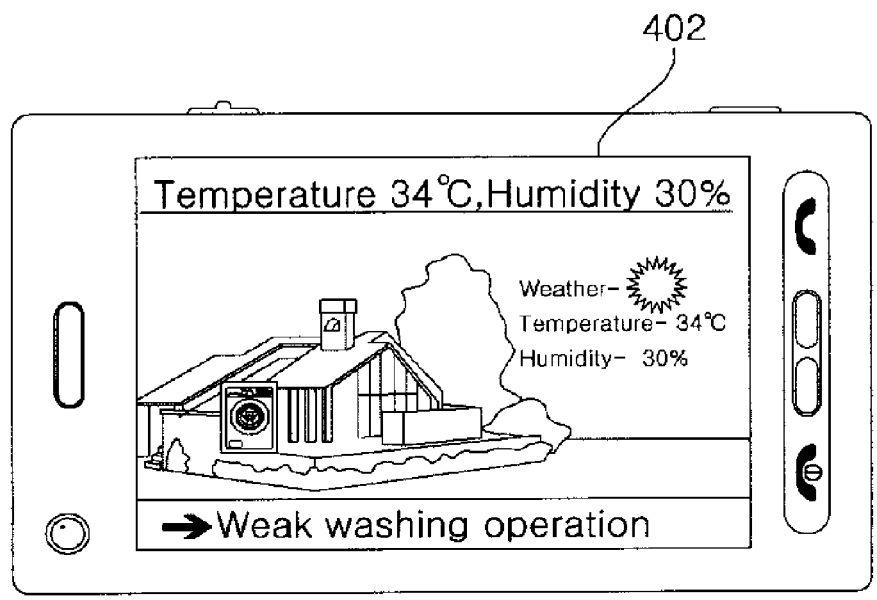
FIG. 4 is a view illustrating an exemplary embodiment of a recommended washing machine operation screen according to weather.
Figure 5:
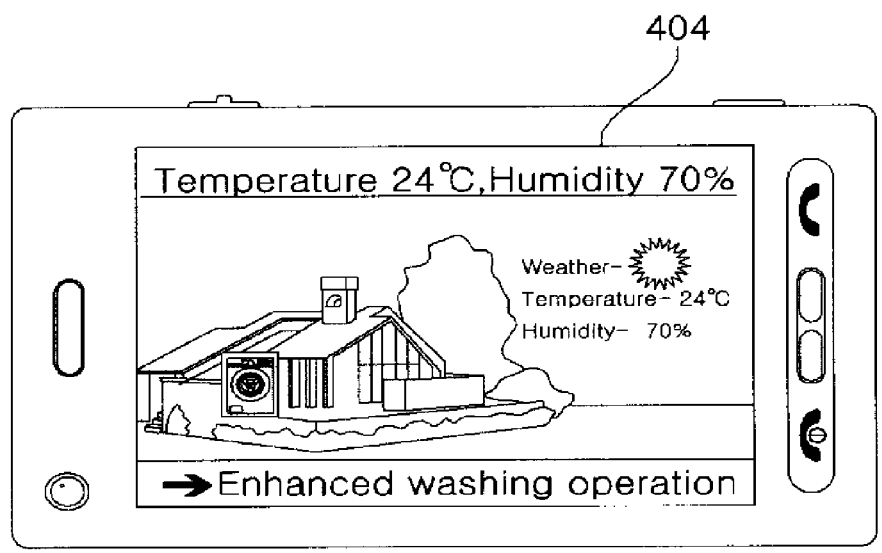
FIG. 5 is a view illustrating another exemplary embodiment of a recommended washing machine operation screen according to weather.
Figure 6:
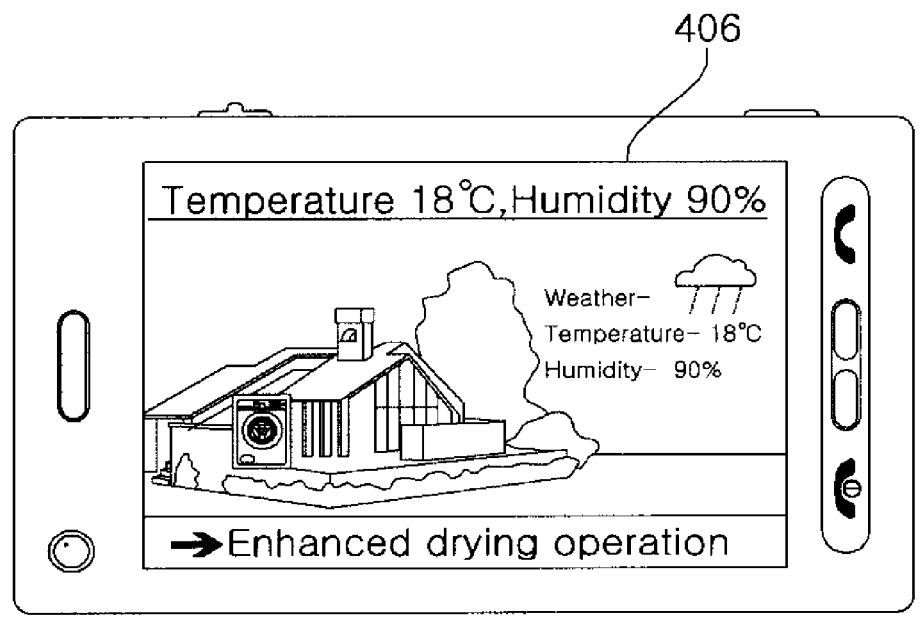
FIG. 6 is a view illustrating a further exemplary embodiment of a recommended washing machine operation screen according to weather.
Figure 7:
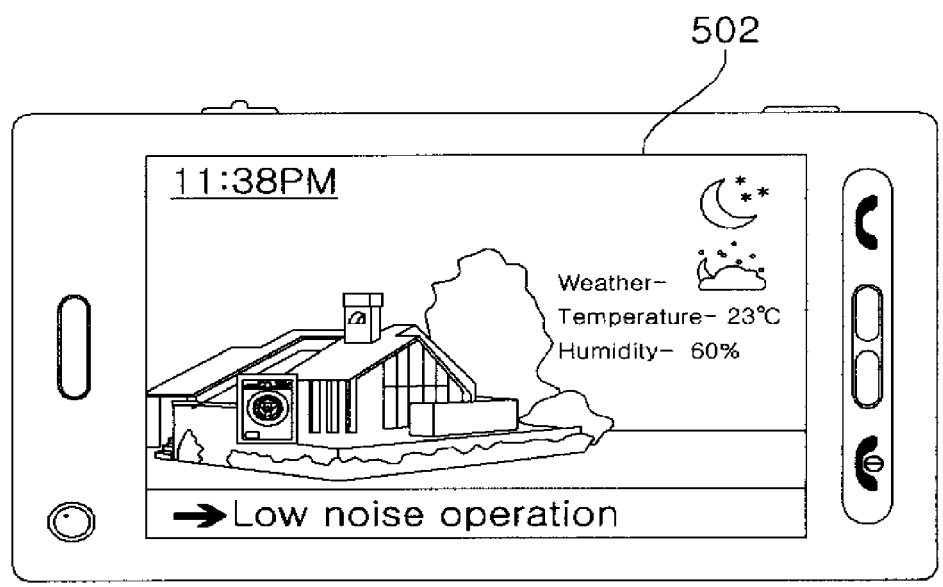
FIG. 7 is a view illustrating an exemplary embodiment of a recommended washing machine operation screen according to time.
Figure 8:
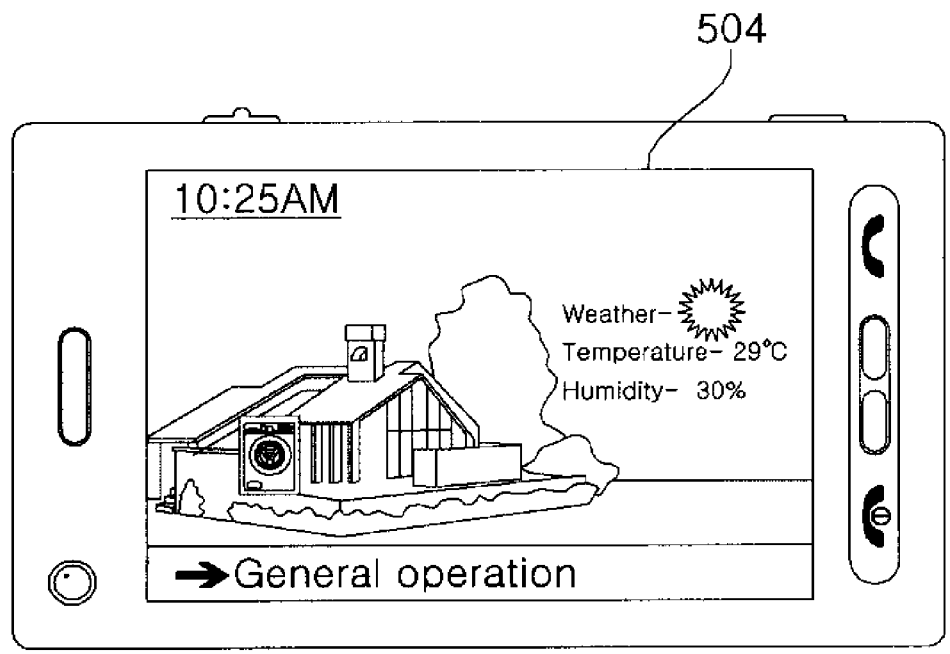
FIG. 8 is a view illustrating another exemplary embodiment of a recommended washing machine operation screen according to time.

FIG. 3 is a flow chart illustrating a method of operating a mobile terminal for controlling a washing machine according to an exemplary embodiment of the present invention. FIGS. 4 to 6 are views illustrating exemplary embodiments of a recommended washing machine operation screen according to weather. FIGS. 7 and 8 are views illustrating exemplary embodiments of a recommended washing machine operation screen according to time. FIGS. 9 to 12 are views illustrating exemplary embodiments of a recommended washing machine operation screen according to season.

Referring to FIG. 3, the mobile terminal according to the present invention displays a menu screen including a washing machine management menu through a display (step S302). The washing machine management menu may include at least one of a recommended operation item, a monitoring item, a software upgrade item, and a remote control item.

The mobile terminal confirms whether the recommended operation item is selected from the washing machine management menu by a user (step S304). If the recommended operation item is selected, the mobile terminal generates recommended washing machine operation information according to external environment information (step S306). The external environment information may include at least one of weather information, time information, and season information.

The mobile terminal receives the external environment information through a wireless Internet module and generates the recommended washing machine operation information according to the received external environment information.

Meanwhile, the mobile terminal may generate the recommended washing machine operation information according to external environment information which is input by a user or is previously stored therein. For example, the external environment information may be previously stored as a table form of database. In this case, the external environment information may include time information, season information, etc. For instance, time from midnight to 6 o'olock in the morning may be set to night time as the external environment information.

The recommended washing machine operation information may be generated by a wireless Internet server to be provided to the mobile terminal as well as by the mobile terminal Namely, the mobile terminal may generate one of weak washing operation, enhanced washing operation, and enhanced drying operation as the recommended washing machine operation information with reference to the weather information. The weather information may include at least one of weather, temperature, and humidity.

The mobile terminal may generate low noise operation or general operation as the recommended washing machine operation information with reference to the time information.

The mobile terminal may generate one of spring standard course operation, wool course operation, fall standard course operation, and synthetic fiber course operation as the recommended washing machine operation information with reference to the season information.

Meanwhile, the mobile terminal displays a recommended washing machine operation screen including the recommended washing machine operation information generated through the display (step S308).

The mobile terminal may display, as the recommended washing machine operation screen according to the weather information, a recommended weak washing operation screen 402 shown in FIG. 4, a recommended enhanced washing operation screen 404 shown in FIG. 5, and a recommended enhanced drying operation screen 406 shown in FIG. 6. In this case, the weather information may also be displayed together with the screens.

For example, in high-temperature and low-humidity weather, the mobile terminal may display 'weak washing operation' information based on such weather information as shown in FIG. 4. Whether temperature is high or low and whether humidity is high or low may be judged based on a preset value.

In low-temperature and high-humidity weather, for example, the mobile terminal may display 'enhanced drying operation' information based on such weather information as shown in FIG. 6.

If temperature and humidity are proper, the mobile terminal may display 'enhanced washing operation' information based on such weather information as shown in FIG. 5.

The mobile terminal may display, as the recommended washing machine operation screen according to the time information, a recommended low noise operation screen 502 shown in FIG. 7 and a recommended general operation screen shown in FIG. 8. In this case, the time information may also be displayed together with the screens.

For example, in the night, the mobile terminal may display 'low noise operation' information based on such time information as shown in FIG. 7.

During the daytime for example, the mobile terminal may display 'general operation?information' based on such time information as shown in FIG. 8.

Figure 9:
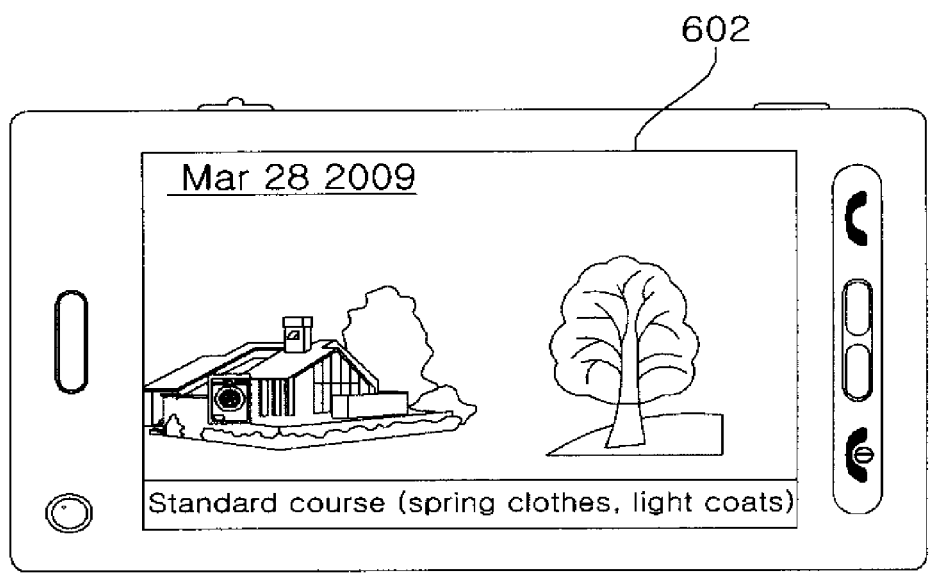
FIG. 9 is a view illustrating an exemplary embodiment of a recommended washing machine operation screen according to season.
Figure 10:
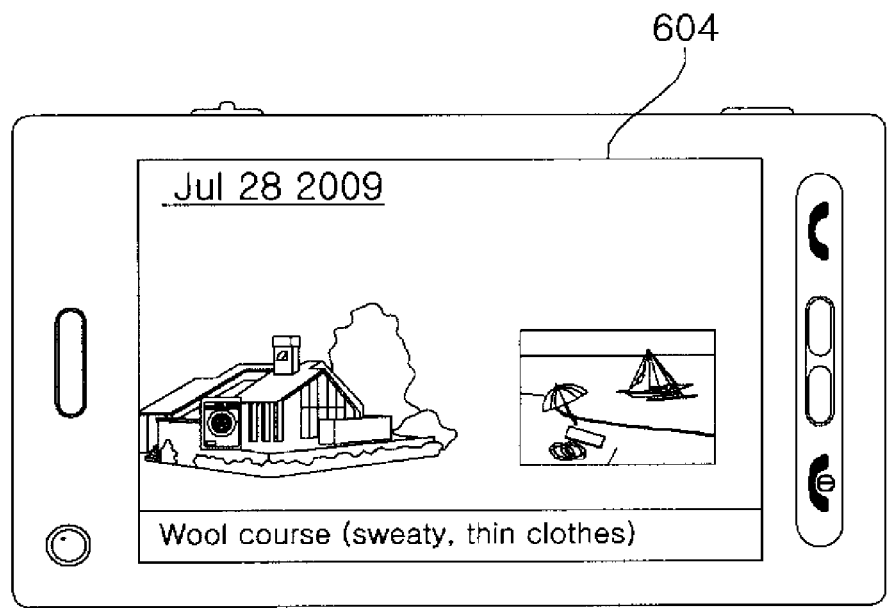
FIG. 10 is a view illustrating another exemplary embodiment of a recommended washing machine operation screen according to season.
Figure 11:
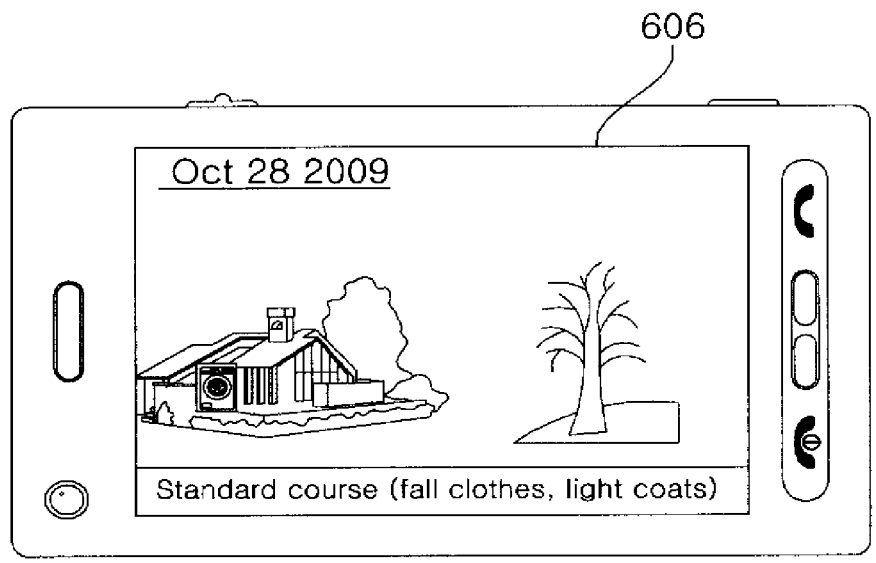
FIG. 11 is a view illustrating a further exemplary embodiment of a recommended washing machine operation screen according to season.
Figure 12:
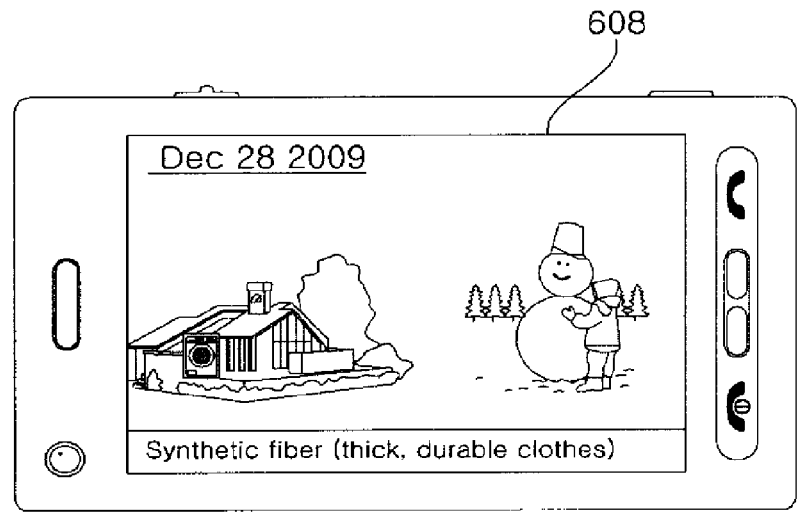
FIG. 12 is a view illustrating another exemplary embodiment of a recommended washing machine operation screen according to season.

The mobile terminal may display, as the recommended washing machine operation screen according to the season information, a recommended spring standard course operation screen 602 shown in FIG. 9, a recommended wool course operation screen 604 shown in FIG. 10, a recommended fall standard course operation screen 606 shown in FIG. 11, and a recommended synthetic fiber course operation screen 608 shown in FIG. 12. In this case, the season information or time information may also be displayed together with the screens.

For example, in spring, the mobile terminal may display 'standard course operation' information based on such season information as shown in FIG. 9. Meanwhile, the recommended operation information according to the season information may be differently set according to areas where a washing machine is installed. For example, the recommended operation information according to the season information may vary with the latitude of an area where a washing machine is installed.

For example, in summer, the mobile terminal may display 'wool course' information based on such season information as shown in FIG. 10.

In fall for example, the mobile terminal may display 'standard course' information based on such season information as shown in FIG. 11.

In winter for example, the mobile terminal may display 'synthetic fiber course' information based on such season information as shown in FIG. 12.

Meanwhile, the mobile terminal confirms whether a user selects washing machine control for specific recommended operation (step S310).

If the control for specific recommended operation is selected, the mobile terminal transmits a corresponding recommended operation control signal to a washing machine, thereby remotely controlling the washing machine (step S312).

Figure 13:
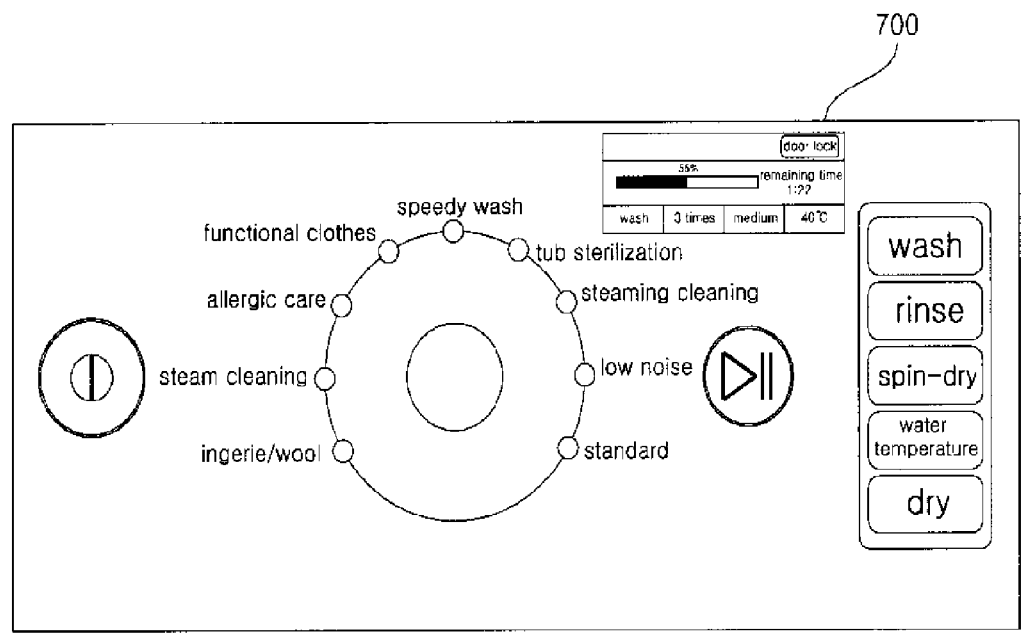
FIG. 13 is a view illustrating a remote control screen displayed on a mobile terminal according to the present invention.

FIG. 13 is a view illustrating a remote control screen displayed on a mobile terminal according to the present invention.

Referring to FIG. 13, if a user selects a remote control item through a menu screen displayed through a display, the mobile terminal according to the present invention displays a washing machine remote control screen 700 on the display and transmits a washing machine control signal generated by the manipulation of the user to a washing machine.

The washing machine remote control screen 700 may include at least one of operation state information and an operation input menu. The operation state information may include at least one of operation course, operation administration, remaining time, operation time, number of operations, water temperature information, door lock information, and water level information. The operation input menu may include at least one of an operation course input menu, an operation administration input menu, and an operation time input menu.

For example, as shown in FIG. 13, the washing machine remote control screen 700 may include standard, low noise, boiling wash, tub sterilization, speedy wash, functional clothes, allergic care, steam cleaning, lingerie/wool, etc., as the operation course, and may include wash, rinse, spin-dry, dry, etc. as the operation administration.

Meanwhile, the menu screen displayed on the display of the mobile terminal may include only the remote control item.

Figure 14:
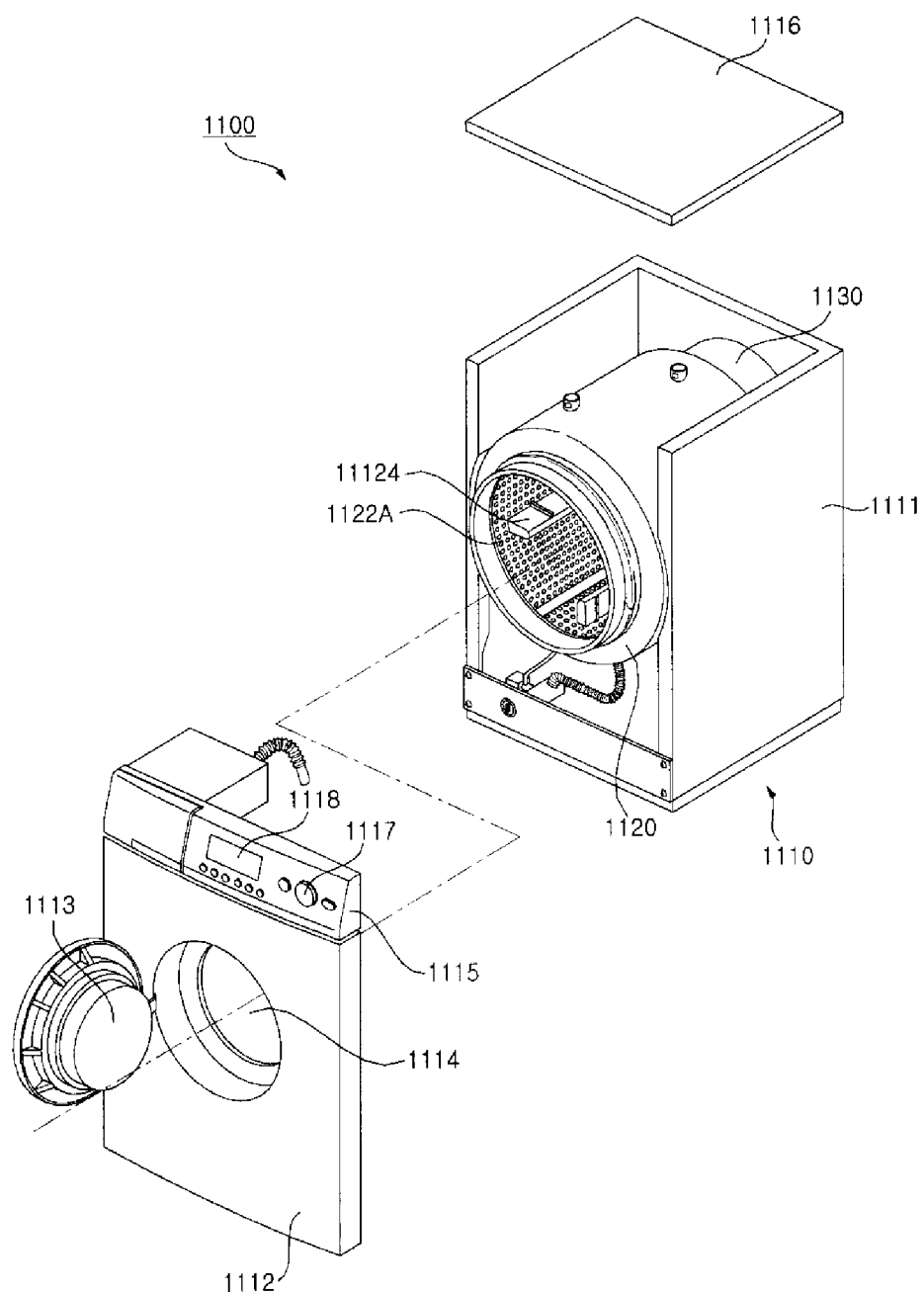
FIG. 14 is a perspective view of a washing machine according to an exemplary embodiment of the present invention.

FIG. 14 is a perspective view of a washing machine according to an exemplary embodiment of the present invention.

Description is given below with reference to the drawing.

A washing machine 1100 includes a cabinet 1110 forming an external shape of the washing machine 1100, a tub 1120 disposed within the cabinet 1110 and supported by the cabinet 1110, a drum 1122 disposed within the tub 1120 in which laundry is washed, a motor 1130 for driving the drum 1122, a wash water supply apparatus (not shown) disposed outside a cabinet main body 1111 and configured to supply wash water to the cabinet 1110, and a drain apparatus (not shown) formed under the tub 1120 and configured to drain wash water to the outside.

A plurality of through-holes 1122A for having wash water pass therethrough is formed in the drum 1122. Lifters 1124 can be disposed within the drum 1112 so that the laundry is raised up to a specific height when the drum 1122 is rotated and then dropped because of gravity.

The cabinet 1110 includes the cabinet main body 1111, a cabinet cover 1112 disposed on the front side of the cabinet main body 1111 and coupled thereto, a control panel 1115 disposed on an upper side of the cabinet cover 1112 and coupled to the cabinet main body 1111, and a top plate 1116 disposed at the top of the control panel 1115 and coupled to the cabinet main body 1111.

The cabinet cover 1112 includes a laundry inlet/outlet hole 1114 formed to have laundry pass therethrough, and a door 1113 disposed rotatably left and right so that the laundry inlet/outlet hole 1114 is opened and closed.

The control panel 1115 includes a user input unit 1117 for manipulating operating states of the washing machine 1100, and a display 1118 disposed on one side of the user input unit 1117 and configured to display operating states of the washing machine 1100.

The user input unit 1117 and the display 1118 within the control panel 1115 are electrically connected to a controller (not shown). The controller (not shown) electrically controls respective constituent elements, etc. of the washing machine 1100. An operation of the controller (not shown) is described later on.

Figure 15:
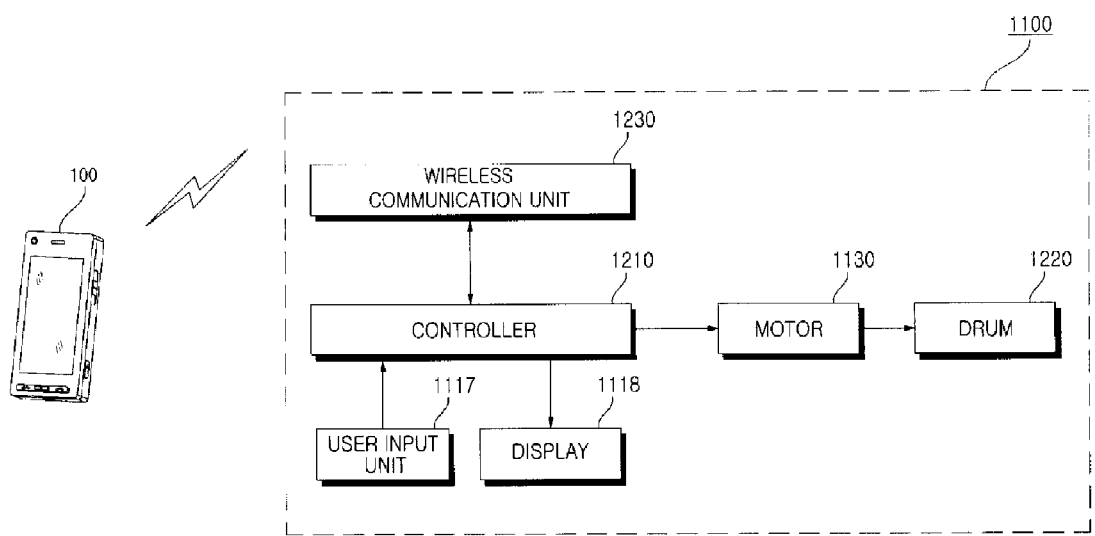
FIG. 15 is an internal block diagram of the washing machine shown in FIG. 14.

FIG. 15 is an internal block diagram of the washing machine shown in FIG. 14. Description is given below with reference to the drawing. First, a controller 1210 operates in response to an operation control signal received from the user input unit 1117. Thus, actual washing, rinse, and dehydration cycles can be performed. For the actual washing, rinse, and dehydration cycles, the controller 1210 controls the motor 1130. Although not shown in the drawings, an inverter (not shown) can be used to control the motor. For example, when the controller 1210 outputs a PWM switching control signal to the inverter (not shown), the inverter (not shown) can perform a high-speed switching operation in order to supply an AC power of a specific frequency to the motor 1130.

Also, the controller 1210 may operate in response to an operation control signal received from the mobile terminal 100. For example, the operation control signal may include recommended washing machine operation information.

The controller 1210 may control washing machine 1100 in operation mode of any one of weak washing operation, enhanced washing operation, and enhanced drying operation as the recommended washing machine operation information, with reference to the weather information.

The controller 1210 may control washing machine 1100 in operation mode of low noise operation or general operation as the recommended washing machine information with reference to the time information.

The controller 1210 may control washing machine 1100 in operation mode of any one of spring standard course operation, wool course operation, fall standard course operation, and synthetic fiber course operation as the recommended washing machine operation information, with reference to the season information.

The controller 1210 may control the wireless communication unit 1230 to communicate with the mobile terminal 100 for at least one of operation diagnosis information, error content information, and a service call item.

The controller 1210 may control the software upgrade processing according to the received upgrade program, for example, firmware.

Meanwhile, the controller 1210 can display operating states of the washing machine 1100 through the display 1118. For example, the controller 1210 can display operating states, such as actual washing, rinse, and dehydration cycles, through the display 1118.

The wireless communication unit 1230 may transmit and receive wireless signals to and from at least one of a mobile terminal, a base station, an external terminal, and a server in a communication network. The wireless signals may include an audio signal, a video signal or various forms of data.

For example, the wireless communication unit 1230 may receive recommended washing machine operation information which is set according to external environment information. Here, external environment information may include at least one of weather information, time information, and season information. The external environment information may be received through a wireless Internet server or previously stored as a table form of database or set by user.

Also, for example, the wireless communication unit 1230 may transmit at least one of operation state information and an operation input menu information and receive operation control signal. The operation state information may include at least one of operation course, operation administration, remaining time, operation time, number of operations, water temperature information, door lock information, and water level information. The operation input menu information may include at least one of an operation course input menu, an operation administration input menu, and an operation time input menu. Meanwhile, the operation control signal may include the recommended washing machine operation information.

Also, for example, the wireless communication unit 1230 may receive the operation control signal including washing machine diagnosis data by directly or indirectly accessing a service center. The washing machine diagnosis data may include operation stop signal of washing machine 1100.

Meanwhile, the wireless communication of the washing machine 1100 is not limited to the mobile terminal 100. The washing machine 1100 may other electronic device, a base station, an external terminal, or Internet server, etc.

The motor 1130 drives the drum 1122. The drum 1122 is disposed within the tub 1120, as shown in FIG. 14, and has laundry for washing input therein. The drum 1122 is driven by the rotation of the motor 1130.

Figure 16:
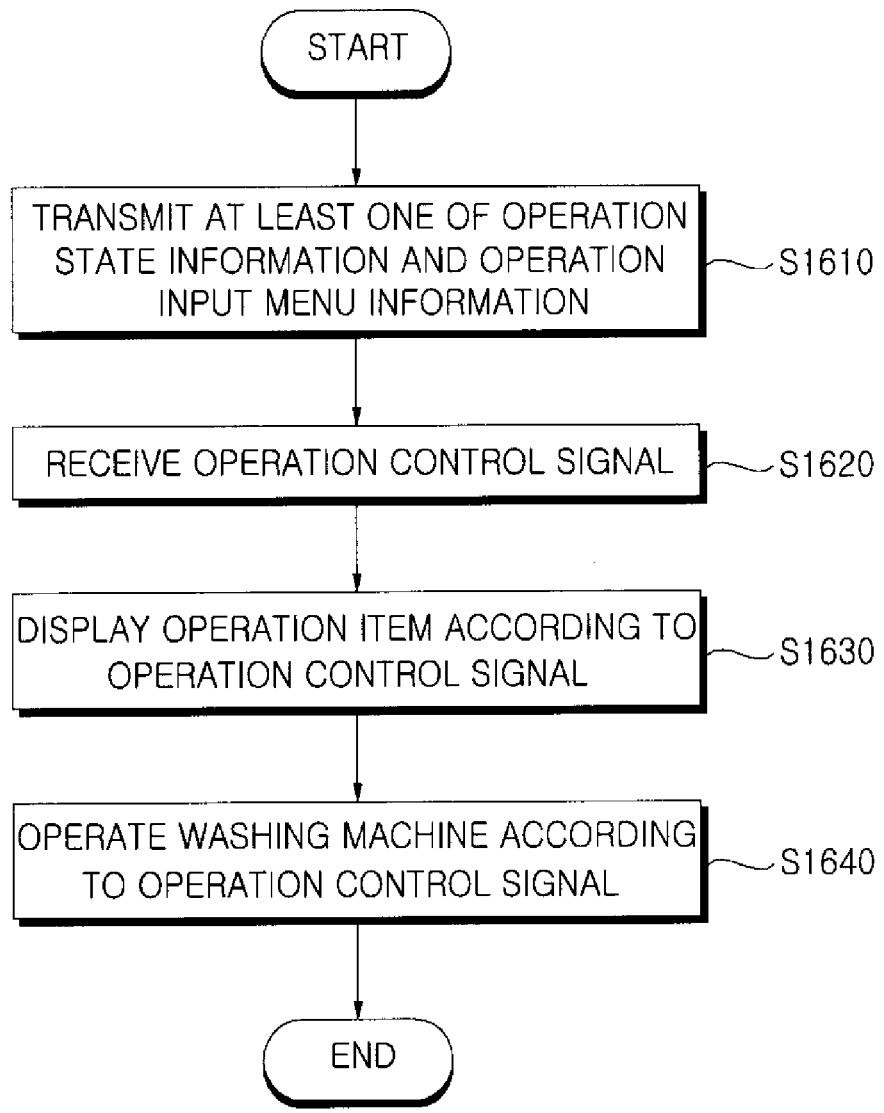
FIG. 16 is a flow chart illustrating a method of operating a washing machine according to an exemplary embodiment of the present invention.

FIG. 16 is a flow chart illustrating a method of operating a washing machine according to an exemplary embodiment of the present invention.

Referring to FIG. 16, the washing machine according to the present invention may transmit at least one of operation state information and an operation input menu information (step S1610). The operation state information may include at least one of operation course, operation administration, remaining time, operation time, number of operations, water temperature information, door lock information, and water level information. The operation input menu information may include at least one of an operation course input menu, an operation administration input menu, and an operation time input menu.

The washing machine may receive operation control signal from the mobile terminal (step S1620). The received operation control signal may include recommended washing machine operation information generated from the mobile terminal 100.

The washing machine may display operation item according to the received operation control signal (step S1630). The controller may control for displaying the operation item according to the received operation control signal.

The washing machine may operate according to the received operation control signal (step S1640). For example, the washing machine may operate one of weak washing operation, enhanced washing operation, and enhanced drying operation as the recommended washing machine operation information, with reference to the weather information.

Also, for example, the washing machine may operate low noise operation or general operation as the recommended washing machine information with reference to the time information.

Also, for example, the washing machine may operate any one of spring standard course operation, wool course operation, fall standard course operation, and synthetic fiber course operation as the recommended washing machine operation information, with reference to the season information.

Also, for example, the washing machine may stop the operation when the received operation control signal includes operation stop signal.

Mode for Invention

Various embodiments have been described in the best mode for carrying out the invention.

INDUSTRIAL APPLICABILITY

The present invention is applied to a mobile terminal to control a washing machine by displaying recommended washing machine operation information.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of operating a mobile terminal for controlling a washing machine, the method comprising:
displaying, on a mobile terminal, a menu screen including a washing machine management menu, the mobile terminal comprising:
a wireless communication unit configured to collect external information or transmit recommended operation information to the washing machine, the wireless communication unit comprising:
a Global Positioning System (GPS) module configured to receive location information, and
a mobile communication module configured to transmit and receive voice call signals;
an output unit comprising:
an audio output module configured to output an audio signal processed by the mobile terminal, and
a display configured to output a video signal processed by the mobile terminal;
an input unit configured to receive at least one of an external audio input or a video input, the input unit comprising a microphone module configured to receive the external audio input in a call mode of the mobile terminal and convert the received audio signal into audio data;
an interface unit configured to interface communications between the mobile terminal and one or more external devices; and
a sensing unit configured to sense a current state of the mobile terminal, the current state of the mobile terminal including a position of the mobile terminal;
receiving, at the mobile terminal, the location information;
receiving, at the mobile terminal, a selection of a recommended operation item from the washing machine management menu;
in response to receiving the location information and the selection of the recommended operation from the washing machine management menu, displaying recommended washing machine operation information which is set according to external environment information, the recommended washing machine operation information being displayed with weather information, temperature information, and humidity information according to the location information;
displaying at least one of indoor operation diagnosis information, error content information, and a service call item in response to a monitoring item being selected from the washing machine management menu;
accessing a service center server and displaying a service center connecting state screen in response to the service call item being selected; and
transmitting washing machine diagnosis data to the service center,
wherein the external environment information includes at least one of weather information, time information, and season information, and
wherein the recommended washing machine operation information is displayed together with the at least one of weather information, time information, and season information.

2. The method of claim 1, further comprising receiving the external environment information, wherein the recommended washing machine operation information is set according to the received external environment information.

3. The method of claim 1, wherein the displaying of the recommended washing machine operation information includes displaying data indicative of any one of a weak washing operation, an enhanced washing operation, and an enhanced drying operation according to weather information, as the recommended washing machine operation information.

4. The method of 1, wherein the displaying of the recommended washing machine operation information includes displaying data indicative of a low noise operation or a general operation according to time information, as the recommended washing machine operation information.

5. The method of 1, wherein the displaying of the recommended washing machine operation information includes displaying data indicative of any one of spring standard course operation, a wool course operation, a fall standard course operation, and a synthetic fiber course operation according to season information, as the recommended washing machine operation information.

6. The method of claim 1, further comprising displaying a software upgrade processing screen, in response to a software upgrade item being selected from the washing machine management menu.

7. The method of claim 1, wherein the washing machine management menu includes at least one of a recommended operation item, a remote control item, a monitoring item, and a software upgrade item.

8. The method of claim 1, further comprising receiving at least one of operation state information or an operation input menu information,
   wherein the operation state information includes at least one of operation course information, operation administration information, remaining time, operation time, number of operations, water temperature information, door lock information, or water level information, and
   wherein the operation input menu information includes at least one of an operation course input menu, an operation administration input menu, or an operation time input menu.

9. The method of claim 1, further comprising displaying a washing machine remote control screen including at least one of operation state information or an operation input menu,
   wherein the operation state information includes at least one of operation course information, operation administration information, remaining time, operation time, number of operations, water temperature information, door lock information, or water level information, and
   wherein the operation input menu includes at least one of an operation course input menu, an operation administration input menu, or an operation time input menu.

* * * * *